United States Patent [19]
Seki et al.

[11] Patent Number: 5,278,479
[45] Date of Patent: Jan. 11, 1994

[54] TOOL PATH DRAWING METHOD

[75] Inventors: Masaki Seki, Suginami; Takashi Takegahara, Hachioji; Toru Matsunaka, Yanai, all of Japan

[73] Assignee: Fanuc Ltd., Minamitsuru, Japan

[21] Appl. No.: 847,023

[22] PCT Filed: Jul. 25, 1991

[86] PCT No.: PCT/JP91/01003
§ 371 Date: Apr. 9, 1992
§ 102(e) Date: Apr. 9, 1992

[87] PCT Pub. No.: WO92/02346
PCT Pub. Date: Feb. 20, 1992

[30] Foreign Application Priority Data

Aug. 9, 1990 [JP] Japan .................................. 1-210987

[51] Int. Cl.$^5$ .............................................. G06F 11/32
[52] U.S. Cl. .................... 318/568.25; 318/570; 318/569; 364/474.22; 364/474.26
[58] Field of Search .................. 318/568.25, 569, 570; 364/474.22, 474.26

[56] References Cited

U.S. PATENT DOCUMENTS

| | | | |
|---|---|---|---|
| 4,521,860 | 6/1985 | Kanematsu et al. | 364/474 |
| 4,530,046 | 7/1985 | Munekata et al. | 364/191 |
| 5,010,502 | 4/1991 | Diebet et al. | 364/522 |
| 5,075,866 | 12/1991 | Goto et al. | 364/474.24 |
| 5,126,646 | 6/1992 | Fujita et al. | 318/569 |

FOREIGN PATENT DOCUMENTS

| | | | |
|---|---|---|---|
| 62-140745 | 7/1987 | Japan | 364/474.24 |
| WO89/02620 | 3/1989 | Japan | 364/474.26 |
| 2-17509 | 1/1990 | Japan | 364/474.24 |

*Primary Examiner*—William M. Shoop, Jr.
*Assistant Examiner*—Brian Sircus
*Attorney, Agent, or Firm*—Staas & Halsey

[57] ABSTRACT

A tool path drawing method which facilitates confirmation of the movement of a tool associated with three-dimensional machining, comprising steps of drawing, for example, a cylindrical workpiece figure (1) in a perspective view on a display screen (25a), in accordance with workpiece configuration data originated on the basis of an input part program statement as a figure definition statement, and displaying a YZ coordinate system, drawing a tool path (7) associated with machining on the workpiece peripheral surface on the display screen in accordance with NC data originated on the basis of an input part program statement as a motion definition statement, and at the same time, drawing another tool path (8), obtained by developing the foregoing tool path on the YZ plane, on the same display screen. An operator can easily confirm the movement of the tool with reference to both the tool path (7) based on the machining conditions and the tool path (8) based on a machining drawing.

4 Claims, 3 Drawing Sheets

TOOL PATH DRAWING METHOD

BACKGROUND OF THE INVENTION

1. Field of the Invention

The present invention relates to a tool path drawing method, and more particularly, to a tool path drawing method in which a tool path based on the machining conditions and a tool path based on a machining drawing, both associated with a part program for three-dimensional machining, are simultaneously drawn so that the movement of a tool can be easily confirmed.

2. Description of the Related Art

In originating NC data of a machining program using an automatic programming apparatus, an operator enters a part program, prepared with reference to a machining drawing, in the programming apparatus, whereupon the programming apparatus automatically originates the NC data on the basis of the input part program. In this automatic programming, as is generally known, a tool path associated with the originated NC data is drawn on the display screen of the programming apparatus in order that the operator can check the part program for propriety. When using a program associated with three-dimensional machining, e.g., machining on the peripheral surface of a cylindrical workpiece, according to a conventional tool path drawing method, a tool path on a three-dimensional work surface, e.g., a cylindrical surface, is drawn. According to another conventional tool path drawing method, moreover, a tool path obtained by developing the tool path associated with the three-dimensional machining on a plane is drawn.

It is difficult, however, to confirm the movement of a tool on the basis of only one of the tool paths, one on the three-dimensional work surface and one developed on the plane, and the propriety check of the part program required has been laborious.

SUMMARY OF THE INVENTION

The object of the present invention is to provide a tool path drawing method which facilitates confirmation of the movement of a tool associated with three-dimensional machining.

In order to achieve the above object, a tool path drawing method according to the present invention comprises: three-dimensionally drawing a tool path associated with three-dimensional machining on a display screen in accordance with NC data originated on the basis of a part program for three-dimensional machining; and drawing another tool path, obtained by developing the aforesaid tool path on a plane, on the same display screen at the same time with the drawing of the tool path associated with the three-dimensional machining.

According to the present invention, as described above, the tool path associated with the three-dimensional machining and the second tool path obtained by developing it on the plane are simultaneously drawn on the same display screen. Accordingly, an operator can easily confirm the tool movement with reference to both the three-dimensional tool path based on the actual machining conditions and the developed tool path on the plane based on a machining drawing. Thus, the part program for three-dimensional machining can be prepared quickly and accurately, so that the NC data originated on the basis of the part program is subject to no or less errors.

DESCRIPTION OF THE PREFERRED EMBODIMENT

Figure 1:
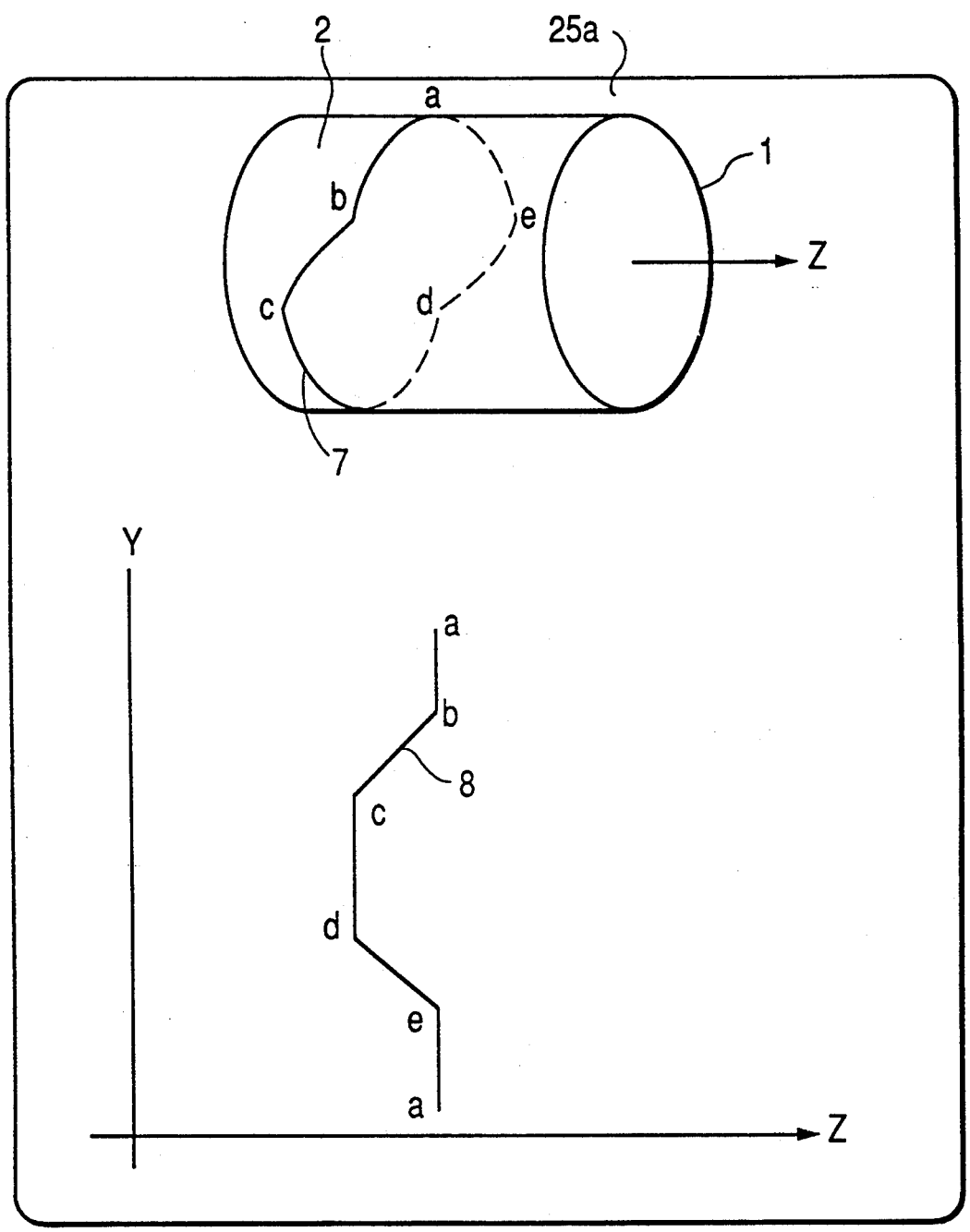
FIG. 1 is a diagram for illustrating a tool path drawing method according to one embodiment of the present invention.

Referring now to FIG. 1, a tool path drawing method according to one embodiment of the present invention will be described.

First, NC data is automatically originated in the conventional manner on the basis of a part program for three-dimensional machining, e.g., a part program used in grooving the peripheral surface of a cylindrical workpiece, and the originated NC data is executed. Based on NC data associated with a figure definition statement, moreover, a workpiece FIG. 1 indicative of the cylindrical workpiece is three-dimensionally drawn in a perspective view on the upper portion of a display screen 25a. A two-dimensional YZ coordinate system, whose coordinate axes include the axis (Z axis) of the cylindrical workpiece and a Y axis perpendicular thereto, is drawn on the lower portion of the display screen 25a. Every time NC data associated with a motion definition statement is executed, thereafter, one of first to fifth sections of a tool path 7 which corresponds to this NC data, along with its preceding tool path section, is drawn on a peripheral surface 2 of the workpiece FIG. 1 which is drawn on the display screen 25a. At the same time, a corresponding one section of another tool path 8 which is obtained by developing the aforesaid one tool path section on the YZ plane, along with its preceding tool path section, is drawn on the YZ coordinate system which is drawn on the display screen 25a. For ease of illustration, symbols a to e and symbols a' to e', which are indicative of the starting points and end points of the respective first to fifth sections of the tool paths 7 and 8, are affixed to the tool paths 7 and 8. Actually, symbols a to e and a' to e' are not displayed on the display screen 25a.

The tool path 7 three-dimensionally represents the movement of a tool on the peripheral surface of the workpiece when the peripheral surface of the workpiece is machined, in conformity with the actual machining conditions. Since the tool move position goes round to the backside of the workpiece in the middle of the third section c-d of the tool path 7, the subsequent portion (hidden line) of the tool path 7 is drawn in broken line. It is clearly indicated that the end point a of the fifth section is identical with the starting point a of the first section, and therefore, that the tool moves around the workpiece peripheral surface. On the other hand, the tool path 8 represents the movement of the tool on the YZ plane with respect to a machining drawing. The tool path 8 clearly indicates that the tool moves in the negative direction with respect to the Y axis in the first, third, and fifth sections a'-b', c'-d' and e'-a', in the negative direction with respect to the Y axis and in the negative direction with respect to a Z axis in the second section b'-c', and in the negative direction with respect to the Y axis and in the positive direction with respect to the Z axis in the fourth section. An operator can easily confirm the movement of the tool with reference to both the tool paths 7 and 8.

Figure 2:
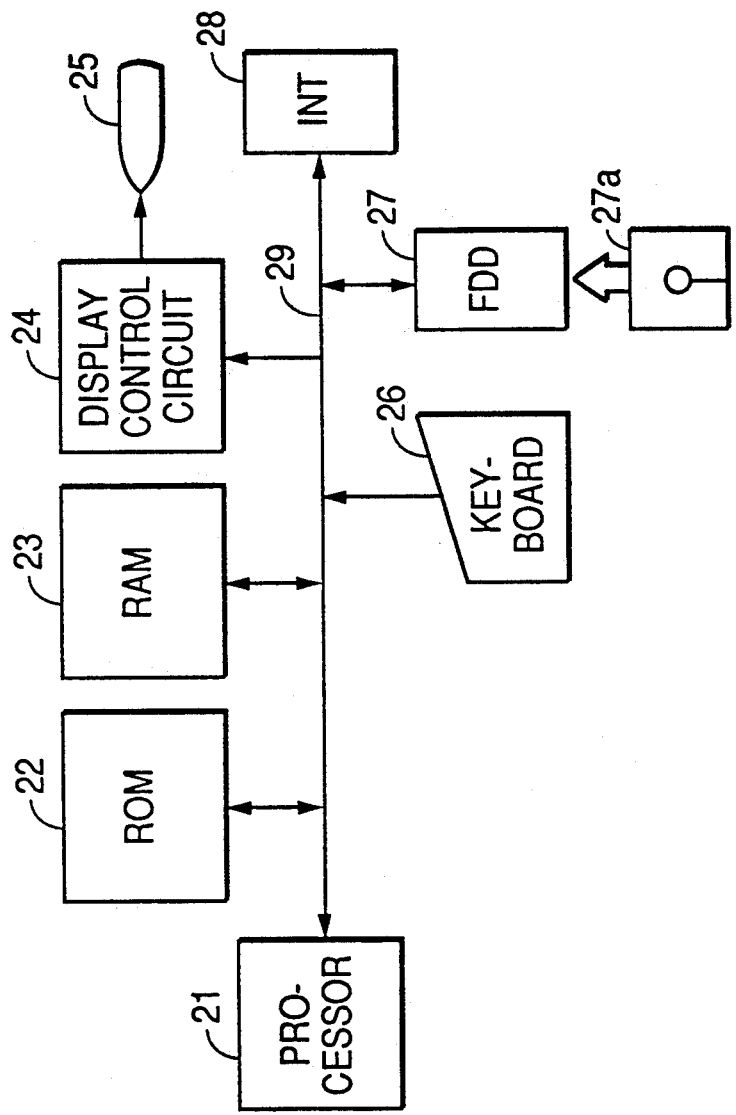
FIG. 2 is a block diagram showing an automatic programming apparatus for carrying out the tool path drawing method of FIG. 1.

Referring now to FIG. 2, an interactive NC automatic programming apparatus for carrying out the aforementioned tool path drawing method will be described.

The programming apparatus automatically originates the NC data on the basis of the part program prepared through a dialogue between the operator and the programming apparatus, executes the NC data, and draws the tool path. The programming apparatus comprises a processor (CPU) 21, and the CPU 21 is connected with a read-only memory (ROM) 22, random access memory (RAM) 23, display control circuit 24, keyboard 26, disk controller 27, and interface circuit 28 by means of a bus 29. The display control circuit 24 is connected with a graphic display device 25, which has the display screen 25a of FIG. 1 and is formed of a cathode ray tube or liquid crystal display unit, and the disk controller 27 is loaded with a floppy disk 27a. The interface circuit 28 is connected, as required, with a printer, tablet system, plotter, etc., which are arranged outside the programming apparatus.

Figure 3:
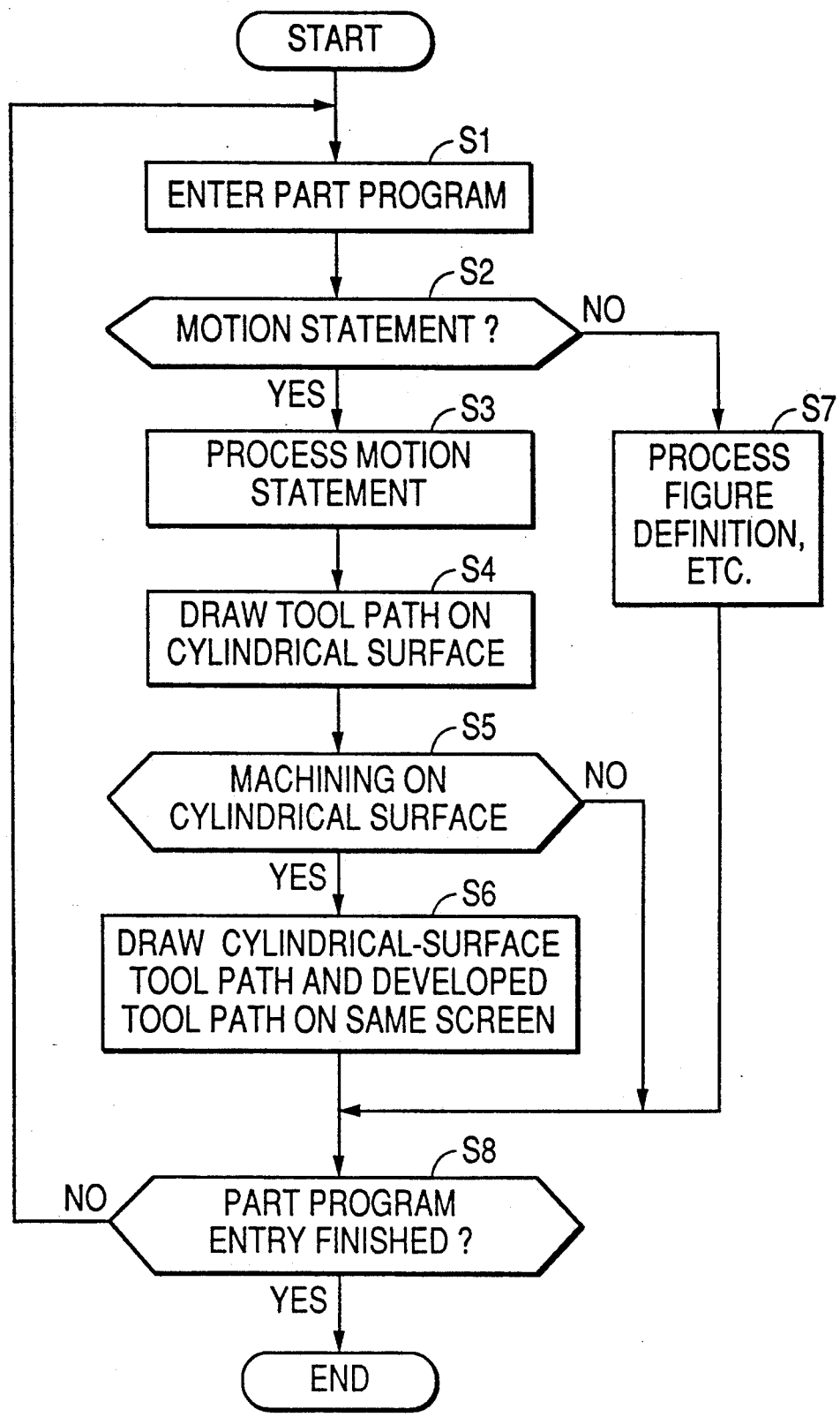
FIG. 3 is a flow chart showing the operation of the programming apparatus of FIG. 2.

Referring now to FIG. 3, the operation of the programming apparatus will be described.

When the programming apparatus is activated, the CPU 21 operates in accordance with a control program read out from the ROM 22, and loads the RAM 23 with a system program read out from the floppy disk 27a, figure data file required for the NC data origination, tool file, machining condition file, etc.

The operator operates the keyboard 26 to prepare the part program for the machining on the peripheral surface of the cylindrical workpiece (three-dimensional machining in general), which includes a series of part program statements described in automatic programming language, through a dialogue with the programming apparatus, and enters the part program in the programming apparatus.

Every time a part program statement is inputted (Step S1 of FIG. 3), the CPU 21 determines whether or not the input part program statement is a motion definition statement (Step S2). Since a figure definition or the like for the workpiece configuration or the like is given before a motion definition, in general, the result of decision in Step S2 is NO. Thereupon, the CPU 21 subjects the input part program statement to processing related to the figure definition statement or the like, originates NC data corresponding to the input part program statement, and loads the RAM 23 with the originated NC data (Step S7). If the input part program statement is associated with the workpiece configuration, workpiece configuration data is delivered from the CPU 21 to the display control circuit 24, and the workpiece configuration data is converted into a display signal by means of the display control circuit 24. Further, the workpiece FIG. 1 is displayed on the display screen 25a of the display device 25, as shown in FIG. 1, and the YZ coordinate system of FIG. 1 is displayed.

Then, the CPU 21 determines whether or not the originated NC data represents the end of the program, thereby determining whether or not the entry of the part program is completed (Step S8). If the result of this decision is NO, the CPU 21 stands ready for the entry of the next part program statement.

If it is concluded in Step S2 that the part program statement inputted thereafter is a motion definition statement which gives instructions for a movement of the tool along a defined figure, this input part program statement is subjected to processing for the motion definition statement, thereby originating NC data corresponding to the input part program statement, and loads the RAM 23 with the NC data (Step S3). If there is any NC data originated before the preceding processing cycle, the originated NC data is converted into a display signal in the display control circuit 24, and a tool path corresponding to the NC data originated before the preceding processing cycle is drawn on the workpiece FIG. 1 (FIG. 1) (Step S4). For example, the first section a-b of the tool path 7 is drawn, as shown in FIG. 1. Alternatively, a tool path (not shown in FIG. 1) which is obtained as the end face of the workpiece is machined is drawn.

Then, the CPU 21 determines whether or not the NC data originated in Step S3 of the present processing cycle is associated with the machining of the cylindrical surface of the workpiece (Step S5). If the NC data is associated with the machining of the workpiece end face, that is, if the result of decision in Step S5 is NO, for example, the program proceeds to Step S8 mentioned before. If the NC data is associated with the machining of the cylindrical surface of the end face of the workpiece, that is, if the result of decision in Step S5 is YES, on the other hand, the CPU 21 calculates a tool path section, e.g., the second section b-c of the tool path 7 shown in FIG. 1, in accordance with the NC data originated in Step S3, and also calculates a tool path section obtained by developing the tool path section b-c on the YZ plane, e.g., the second section b'-c' of the tool path 8 shown in FIG. 1. The calculated data is supplied to the display device 25 through the display control circuit 24, the tool path section b-c is drawn on the peripheral surface 2 of the workpiece FIG. 1, as shown in FIG. 1, and at the same time, the tool path section b'-c' is drawn on the YZ coordinate system (Step S6). Thereupon, the program proceeds to Step S8.

Thereafter, the processes of Steps S1 to S8 are repeated, so that the tool paths 7 and 8 are simultaneously drawn on the same screen 25a, as shown in FIG. 1, for example. In the meantime, the operator confirms the propriety of the input part program statement with reference to the two tool paths 7 and 8, which correspond to the input part program, while inputting the part program statements in order. If the input part program is improper, it is corrected. When the operator inputs a part program statement which is indicative of the program end, the CPU 21 concludes in Step S8 that the entry of the part program is completed, whereupon the tool path drawing process of FIG. 3 ends.

The originated NC data (machining program) stored in the RAM 23 is transferred to and loaded into the floppy disk 27a, as required, and is printed out by means of the printer.

The present invention is not limited to the embodiment described above, and various modifications may be effected therein. For example, although the case of preparing the program for the machining on the peripheral surface of the cylindrical workpiece has been described in connection with the above embodiment, the present invention may alternatively be applied to the preparation of other three-dimensional machining programs. In connection with the above embodiment, moreover, interactive programming has been described such that the preparation of the part program and the propriety check of the part program are carried out in parallel relation. Alternatively, however, the propriety check of the part program may be separately effected after preparing the part program beforehand.

What is claimed is:

1. A tool path drawing method comprising the steps of:
   (a) three-dimensionally displaying a three-dimensional tool path associated with three-dimensional machining on a display screen in accordance with NC data of a part program for three-dimensional machining; and
   (b) displaying a two-dimensional tool path, obtained by developing the three-dimensional tool path on a plane, on the display screen used in step (a), simultaneously with said drawing of the three-dimensional tool path.

2. A tool path drawing method according to claim 1, wherein the part program for three-dimensional machining is a part program used for machining a cylindrical surface of a workpiece.

3. A tool path drawing method according to claim 1, further comprising the step of (c) displaying a workpiece figure indicative of a workpiece in a three-dimensional perspective view on the display screen, prior to step (a), and
   wherein said displaying in step (a) of the three-dimensional tool path is drawn on the workpiece figure.

4. A tool path drawing method according to claim 3, further comprising the step of (d) displaying a two-dimensional coordinate system having a first coordinate axis corresponding to an axis of the workpiece and a second coordinate axis perpendicular to the first coordinate axis on the display screen, and
   wherein the second tool path is drawn on the two-dimensional coordinate system.

* * * * *